US012007531B2

United States Patent
Kim et al.

(10) Patent No.: US 12,007,531 B2
(45) Date of Patent: Jun. 11, 2024

(54) CONTACT LENS COMPRISING CERIA PARTICLES AND METHOD OF FABRICATING THE SAME

(71) Applicant: Research & Business Foundation Sungkyunkwan University, Suwon-si (KR)

(72) Inventors: Jae Yun Kim, Suwon-si (KR); Bong Guen Cha, Suwon-si (KR); Seung Woo Choi, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 980 days.

(21) Appl. No.: 16/220,734

(22) Filed: Dec. 14, 2018

(65) Prior Publication Data

US 2019/0129069 A1    May 2, 2019

(30) Foreign Application Priority Data

Oct. 23, 2017    (KR) .................. 10-2017-0137098

(51) Int. Cl.
  *G02B 1/04*    (2006.01)
  *C08G 77/38*   (2006.01)
  (Continued)

(52) U.S. Cl.
  CPC .............. *G02B 1/043* (2013.01); *C08G 77/38* (2013.01); *C08J 7/16* (2013.01); *G02C 7/04* (2013.01); *G02C 7/049* (2013.01)

(58) Field of Classification Search
  CPC . G02B 1/04; G02B 1/043; C08G 77/38; C08J 7/16; C08J 3/246; G02C 7/04;
  (Continued)

(56) References Cited

U.S. PATENT DOCUMENTS 5,453,467 A * 9/1995 Bamford ............ B01D 67/0093
                                                  525/422
2004/0214914 A1* 10/2004 Marmo ................. G02B 1/043
                                                  523/106
(Continued)

FOREIGN PATENT DOCUMENTS

JP         2015-502437 A        1/2015

OTHER PUBLICATIONS

Korean Office Action issued on Sep. 12, 2018, in counterpart Korean Patent Application No. 10-2017-0137098 (1 page (partial translation) in English, 6 pages in Korean).

*Primary Examiner* — Balram T Parbadia
*Assistant Examiner* — Gabriel A Sanz
(74) *Attorney, Agent, or Firm* — NSIP Law

(57) ABSTRACT

The present disclosure relates to a contact lens containing ceria particles. Further, the present disclosure relates to a method for manufacturing a contact lens containing ceria particles. The method includes preparing ceria particles; preparing poly-2-hydroxyethyl methacrylate (PHEMA or poly-HEMA) in a form of cross-linked hydrogel; mixing the ceria particles and the monomer mixture for poly-2-hydroxyethyl methacrylate (PHEMA or poly-HEMA) with each other to form a mixture; and injecting the mixture in a mold having a contact lens shape; and performing photo-curing polymerization of the mixture. The contact lens effectively eliminates the reactive oxygen species and harmful radicals that are identified as a cause of eye diseases.

9 Claims, 8 Drawing Sheets

Ring of water-soluble ceria nanoparticles composite

Pattern of water-soluble ceria nanoparticles composite

(51) Int. Cl.
*C08J 7/16* (2006.01)
*G02C 7/04* (2006.01)

(58) Field of Classification Search
CPC ..... G02C 7/049; B29B 7/90; B29D 11/00067; B29D 11/00134; C08F 2/50; C08F 220/20; C08F 222/102; C08K 3/22
See application file for complete search history.

(56) References Cited

U.S. PATENT DOCUMENTS

| | | | |
|---|---|---|---|
| 2010/0111789 A1* | 5/2010 | Fajardie | B01J 21/02 |
| | | | 502/263 |
| 2013/0176529 A1* | 7/2013 | Li | C08G 77/38 |
| | | | 427/164 |
| 2013/0195927 A1* | 8/2013 | Sudipta | A61K 33/244 |
| | | | 424/617 |
| 2015/0301228 A1* | 10/2015 | Chang | C08F 230/08 |
| | | | 523/107 |
| 2017/0227680 A1* | 8/2017 | Lai | G02C 7/10 |
| 2017/0299893 A1* | 10/2017 | Pugh | G02C 7/049 |
| 2017/0360994 A1* | 12/2017 | Havenstrite | A61L 15/60 |
| 2018/0001581 A1* | 1/2018 | Patel | B29D 11/00961 |
| 2018/0037690 A1* | 2/2018 | Aitken | C08F 290/068 |
| 2019/0240161 A1* | 8/2019 | Lee | A61K 33/00 |
| 2019/0241703 A1* | 8/2019 | Kato | C08G 64/04 |
| 2020/0032316 A1* | 1/2020 | Lee | G02C 7/04 |

* cited by examiner

[Figure 1]
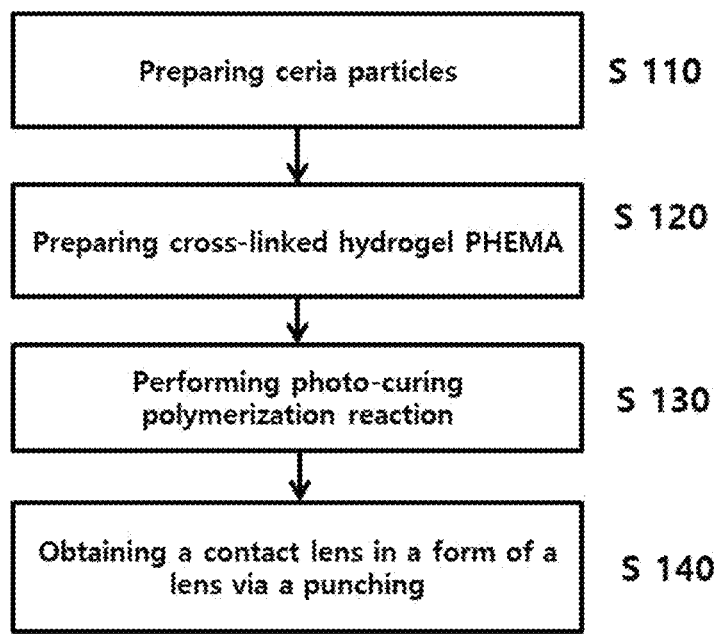

[Figure 2a]
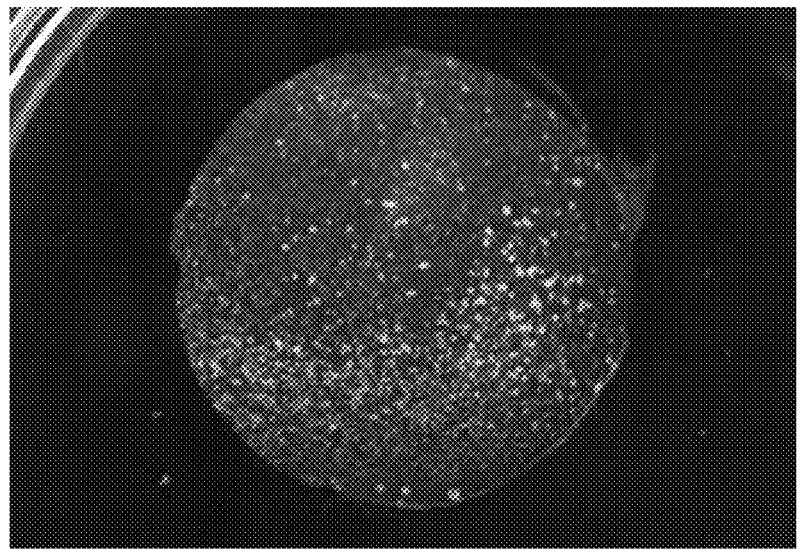
[Figure 2b]
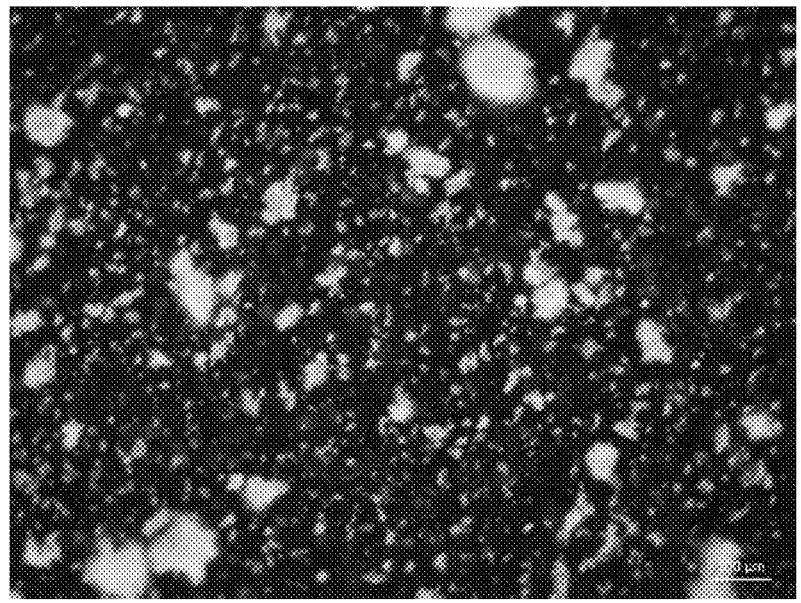

[Figure 3]
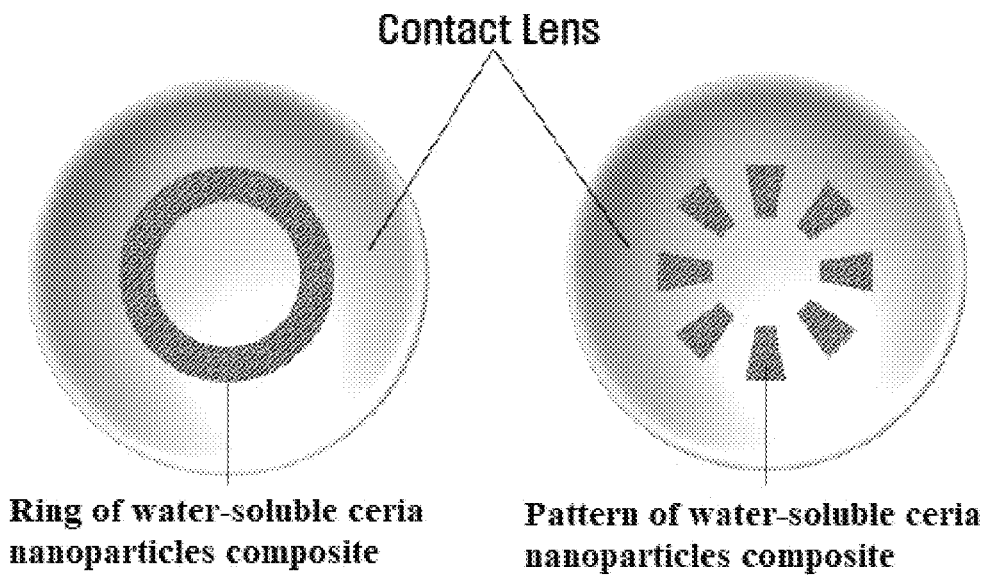
Ring of water-soluble ceria nanoparticles composite
Pattern of water-soluble ceria nanoparticles composite
[Figure 4]
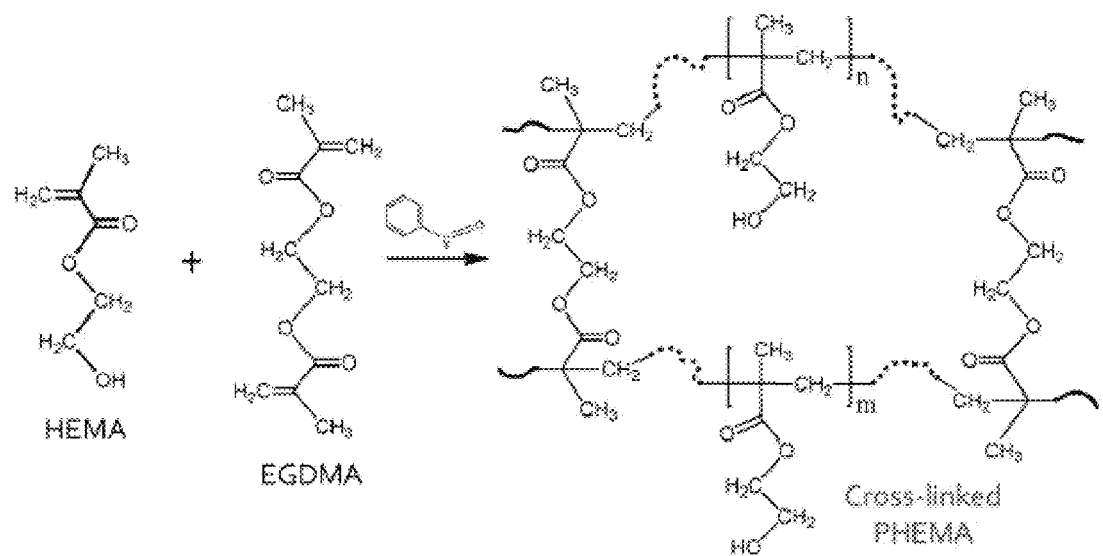

[Figure 5a]
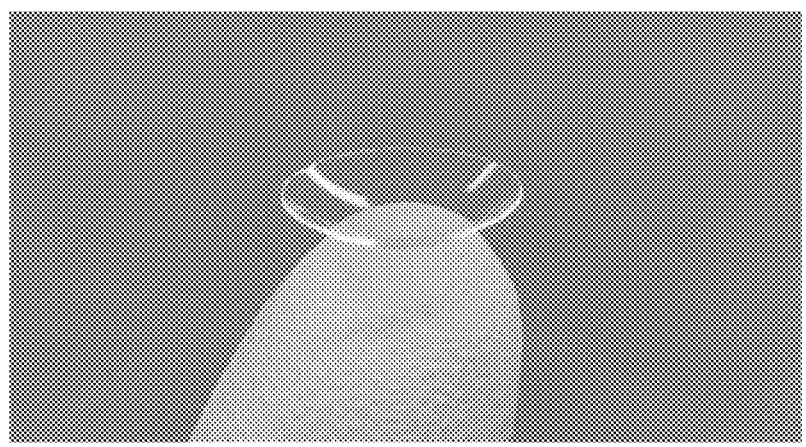
[Figure 5b]

【Figure 6a】
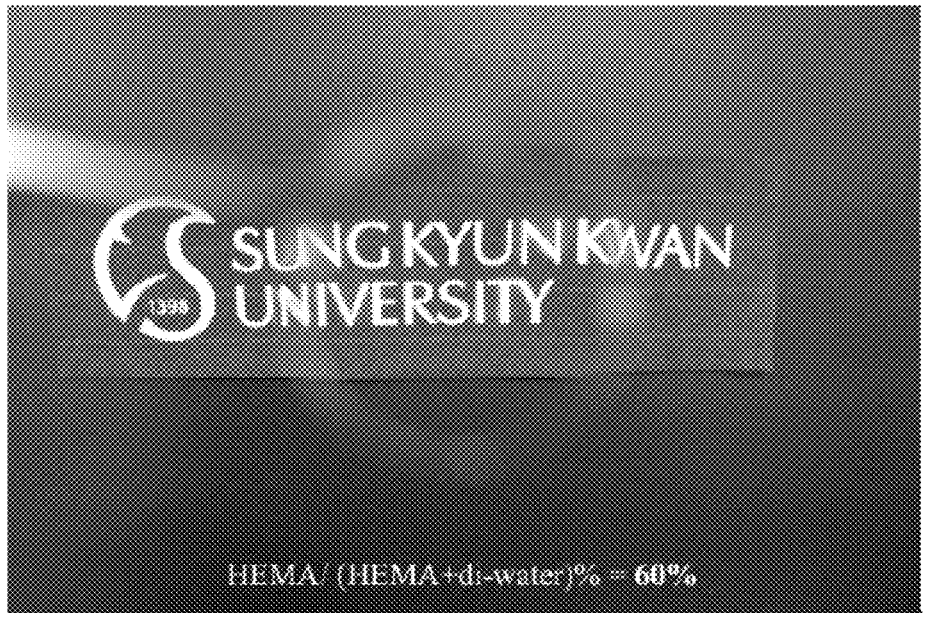
【Figure 6b】
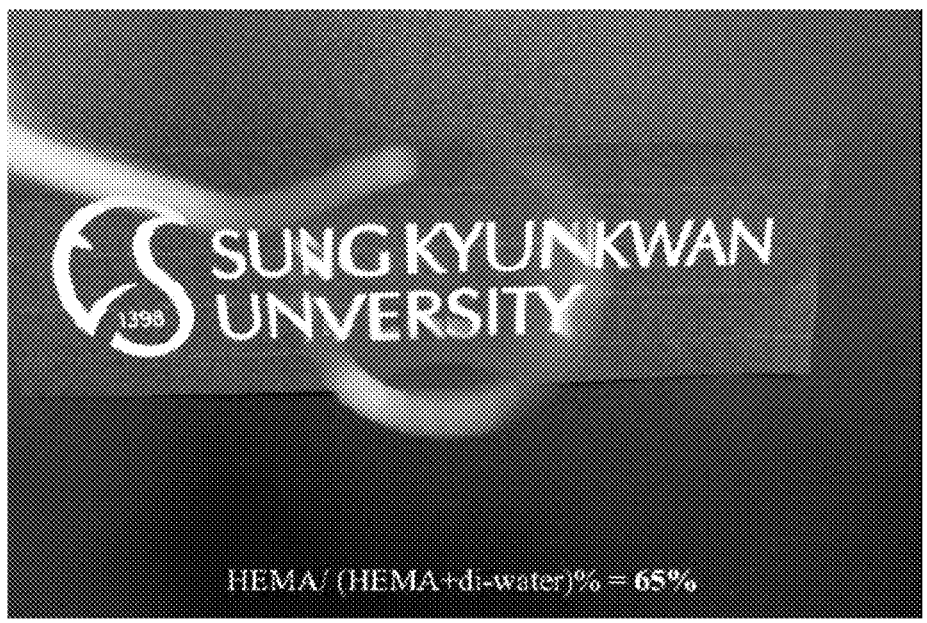

【Figure 6c】
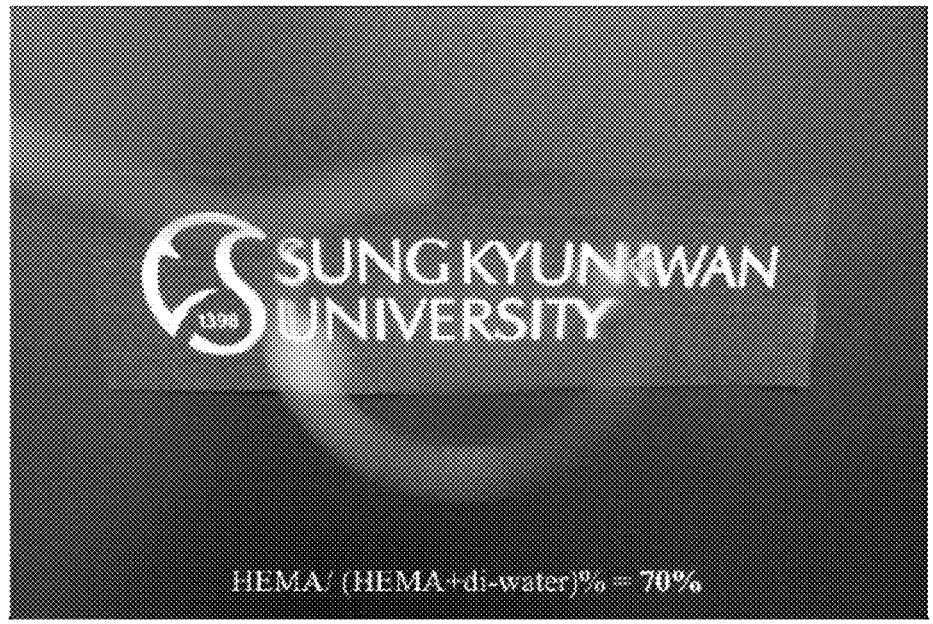
【Figure 6d】
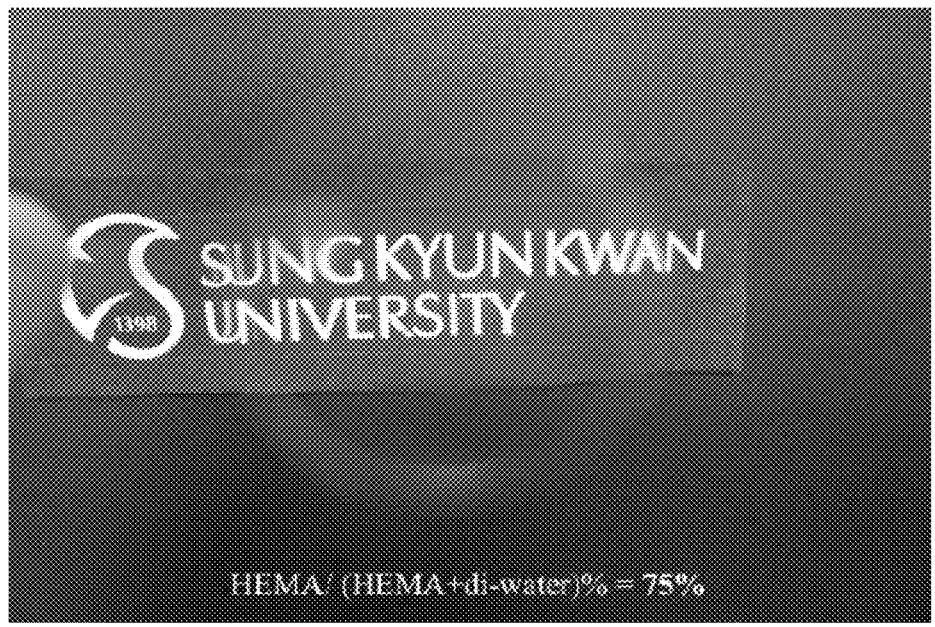

[Figure 6e]
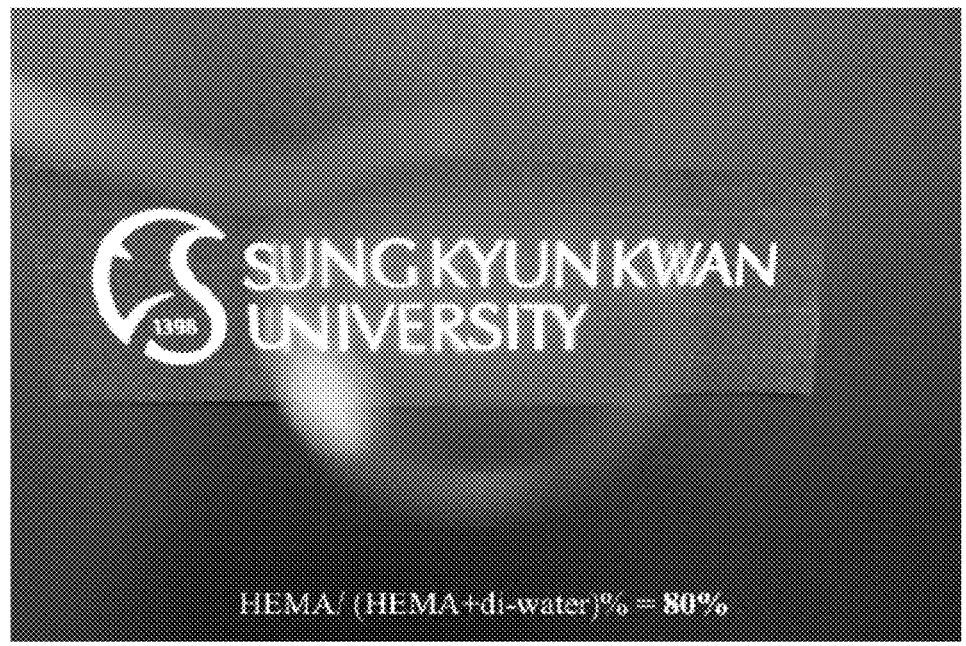

[Figure 7]
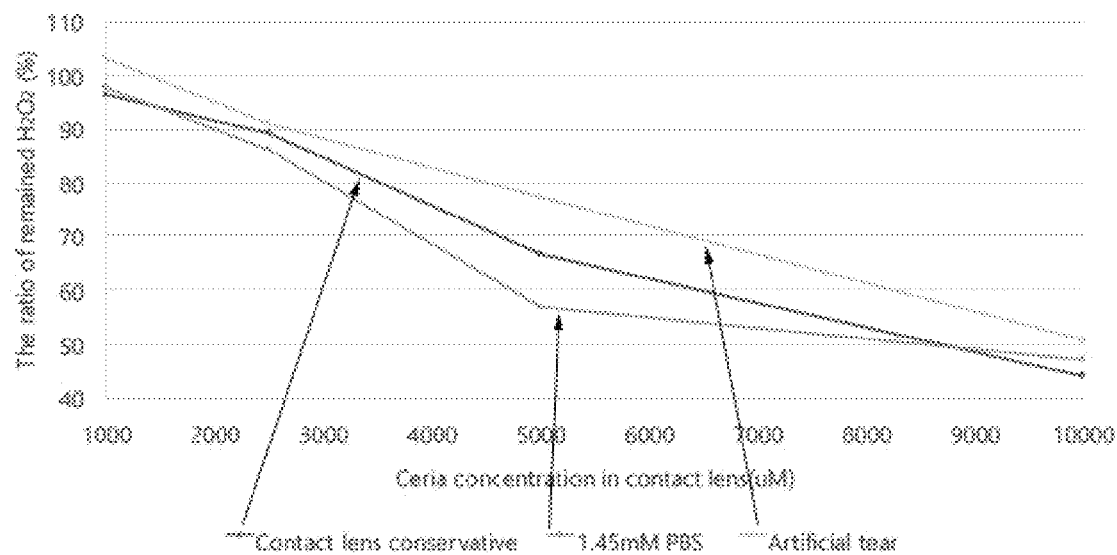

CONTACT LENS COMPRISING CERIA PARTICLES AND METHOD OF FABRICATING THE SAME

CROSS-REFERENCE TO RELATED APPLICATIONS

This application claims the benefit under 35 USC § 119(a) of Korean Patent Application No. 10-2017-0137098 filed on Oct. 23, 2017 in the Korean Intellectual Property Office, the entire disclosure of which is incorporated herein by reference for all purposes.

BACKGROUND

1. Field

The present disclosure relates to a contact lens containing ceria particles. Further, the present disclosure relates to a method for manufacturing a contact lens containing ceria particles.

2. Description of Related Art

A conventional contact lenses is currently being used in clinic for vision correction and cosmetic purposes and eye protection purposes. The lens has a disadvantage that the lens cannot be applied for a practical treatment of eye diseases. Further, in a case of a drug-eluting contact lenses, an amount of drug contained in the contact lens decreases over time and it is difficult to precisely control a rate at which the drug is released from the contact lens over time. Furthermore, there are currently no commercially available contact lenses that can eliminate the reactive oxygen species and harmful radicals. Thus, the currently commercially available contact lenses may have many inadequacies to use for actual treatment and prevention of the eye diseases.

Further, since the reactive oxygen species or harmful radicals cause eye diseases, the elimination of these reactive oxygen species or harmful radicals may be an important factor in using the contact lenses. In addition, the techniques for eliminating the reactive oxygen species or harmful radicals while maintaining transparency are also very necessary.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

An purpose of the present disclosure is to provide a contact lenses containing ceria particles that can eliminate the reactive oxygen species and harmful radicals to treat and prevent eye diseases caused by the reactive oxygen species and harmful radicals.

In a first aspect of the present disclosure, there is provided a method for manufacturing a contact lens containing ceria particles, the method comprising: preparing ceria particles; preparing poly-2-hydroxyethyl methacrylate (PHEMA or poly-HEMA) in a form of cross-linked hydrogel; mixing the ceria particles and the monomer mixture for poly-2-hydroxyethyl methacrylate (PHEMA or poly-HEMA) with each other to form a mixture; and injecting the mixture in a mold having a contact lens shape; and performing photo-curing polymerization of the mixture, wherein the preparing of the PHEMA includes: mixing 2-hydroxyethyl methacrylate (HEMA), ethylene glycol dimethacrylate (EGDMA) and deionized water to form a mixed solution; adding a photo-initiator into the mixed solution; and applying ultraviolet rays to the mixed solution.

In one embodiment of the first aspect, the preparing of the ceria particles includes: dissolving 6-aminohexanoic acid in distilled water to form a first solution; heating the first solution to 90 to 100° C.; dissolving hydrochloric acid in the first solution; adjusting pH of the first solution to 5 to 6; dissolving cerium (III) nitrate hexahydrate in distilled water at room temperature to form a second solution; mixing the heated first solution and the second solution to form a mixed solution; and stirring the mixed solution, and cooling the mixed solution to a room temperature.

In one embodiment of the first aspect, the method further comprises: during preparing the cross-linked hydrogel poly-HEMA (PHEMA), mixing at least one of 1-vinyl-2-pyrrolidinone (NVP), methyl methacrylate (MMA), and methacrylic acid (MAA) with the monomer mixture for PHEMA to form a mixture; and performing photo-curing polymerization reaction of the mixture.

In one embodiment of the first aspect, the method further comprises, after performing the photo-curing polymerization of the mixture, punching the cured mixture to obtain a contact lens in a form of a lens.

In one embodiment of the first aspect, in preparing the poly-2-hydroxyethyl methacrylate (PHEMA or poly-HEMA), a ratio between contents of the HEMA and deionized water is controlled to satisfy a following relationship: HEMA/(HEMA+deionized water)≤70%.

In a second aspect of the present disclosure, there is provided a contact lens comprising: poly-2-hydroxyethyl methacrylate (PHEMA or poly-HEMA) in a form of hydrogel; and ceria particles dispersed in the poly-2-hydroxyethyl methacrylate (PHEMA or poly-HEMA).

In one embodiment of the second aspect, the ceria particles eliminate the reactive oxygen species or harmful radicals.

In one embodiment of the second aspect, the ceria particles are prepared by: dissolving 6-aminohexanoic acid in distilled water to form a first solution; heating the first solution to 90 to 100° C.; dissolving hydrochloric acid in the first solution; adjusting pH of the first solution to 5 to 6; dissolving cerium (III) nitrate hexahydrate in distilled water at room temperature to form a second solution; mixing the heated first solution and the second solution to form a mixed solution; and stirring the mixed solution, and cooling the mixed solution to a room temperature.

In one embodiment of the second aspect, the PHEMA is prepared by: mixing 2-hydroxyethyl methacrylate (HEMA), ethylene glycol dimethacrylate (EGDMA) and deionized water to form a mixed solution; adding a photo-initiator into the mixed solution; and applying ultraviolet rays to the mixed solution.

In one embodiment of the second aspect, a ratio between contents of the HEMA and deionized water is controlled to satisfy a following relationship: HEMA/(HEMA+deionized water)≤70%.

In a third aspect of the present disclosure, there is provided a contact lens comprising: poly-2-hydroxyethyl methacrylate (PHEMA or poly-HEMA) in a form of hydrogel; and an insertion received in the poly-2-hydroxyethyl methacrylate (PHEMA or poly-HEMA), wherein the insertion is composed of ceria particles at a high concentration, wherein the insertion has a pattern surrounding a center of the contact lens.

In one embodiment of the third aspect, the insertion has a ring shape.

The contact lens containing the ceria particles as presented in the present disclosure may effectively eliminate the reactive oxygen species and harmful radicals that are identified as causes of many eye diseases and thus may treat and prevent the eye diseases.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 1 shows a flow chart of a method for manufacturing a contact lens containing ceria particles according to one embodiment of the present disclosure.

FIG. 2a and FIG. 2b respectively show a view of a contact lens containing commercially available conventional ceria and an enlarged microscope image thereof.

FIG. 3 shows a configuration of a contact lens containing ceria particles according to one embodiment of the present disclosure, wherein the ceria particles have a particular arrangement.

FIG. 4 shows a reaction to obtain a poly-HEMA (PHEMA) hydrogel.

FIGS. 5a and 5b show a 14 mm-diametered contact lens containing ceria nanoparticles produced according to an embodiment of the present disclosure.

FIGS. 6a to 6e show a transparency of the contact lens based on a HEMA/(HEMA+deionized water) % value.

FIG. 7 shows a result of an Amplex red hydrogen peroxide/peroxidase assay to confirm a hydrogen peroxide elimination ability by the contact lens containing water-soluble ceria nanoparticles according to one embodiment of the present disclosure.

DETAILED DESCRIPTIONS

For simplicity and clarity of illustration, elements in the FIGS. are not necessarily drawn to scale. The same reference numbers in different FIGS. denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

The contact lens according to the present disclosure contains ceria particles which may eliminate the reactive oxygen species and harmful radicals. In the present specification, the ceria particles may mean ceria particles or nanocomposite thereof.

FIG. 1 shows a flow chart of a method for manufacturing a contact lens containing ceria particles according to one embodiment of the present disclosure.

As shown in FIG. 1, a method for manufacturing a contact lens containing ceria particles according to an embodiment of the present disclosure includes a step S 110 of preparing ceria particles; a step S 120 of preparing a cross-linked hydrogel PHEMA; and a step S 130 of performing a photo-curing polymerization reaction. In one example, the method may additionally include a step S 140 of obtaining a contact lens in a form of a lens via a punching operation.

At the step S 110, the ceria particles are prepared. The ceria or cerium oxide particles have the ability to eliminate the reactive oxygen species and harmful radicals. According to the present disclosure, production of ceria particles is as follows.

Preparing the ceria particles may include:
1) dissolving 6-aminohexanoic acid in distilled water to form a first solution, heating the solution to 90 to 100° C., dissolving hydrochloric acid in the first solution, and adjusting the pH of the first solution to 5 to 6; and 2) dissolving cerium (III) nitrate hexahydrate in distilled water at room temperature to form a second solution, mixing the heated first solution and the second solution to form a mixed solution, stirring the mixed solution, and cooling the mixed solution to a room temperature. Using the above two steps 1) and 2) may produce the ceria particles according to the present disclosure. Then, the ceria particles may be applied to the contact lens.

In a case of manufacturing a contact lens using commercially available conventional ceria particles, the ceria particles aggregate in the contact lens, and thus, a transparency of the contact lens is significantly reduced. This phenomenon may be seen in FIG. 2a and FIG. 2b. As shown in FIG. 2b, the conventional ceria particles aggregate within the contact lens and thus have the problem of losing transparency.

In the step S 120, the cross-linked hydrogel, PHEMA, is prepared. At this step, 2-hydroxyethyl methacrylate (HEMA), ethylene glycol dimethacrylate (EGDMA) and deionized water were mixed to form a mixed solution. A photo-initiator is administered in the mixed solution. Then, ultraviolet rays are applied to the mixed solution to prepare the cross-linked hydrogel PHEMA.

During the step of preparing the cross-linked hydrogel poly-HEMA (PHEMA), the method may further comprise mixing at least one of NVP, MAA, and MMA with the PHEMA to increase the water content in the PHEMA and strength thereof, and performing the photo-curing polymerization reaction for the mixture.

In the step S 120, the ratio between HEMA and deionized water is important. This is because the transparency of the contact lens varies depending on the ratio as described later. To maintain proper transparency for the contact lenses, the ratio between HEMA and deionized water should be controlled to satisfy a following relationship:

HEMA/(HEMA+deionized water) %≤70%.

In the step S 130, the prepared ceria particles and the monomer mixture for PHEMA are mixed with each other to obtain a mixture. The mixture is injected into a contact lens shaped mold, and the mixture is subjected to a photo-curing polymerization reaction.

In the step S 140, after performing the photo-curing polymerization reaction in the step S 130, a contact lens in the form of a lens is obtained via a punching operation or the like.

The method for manufacturing the contact lens containing the ceria particles has been illustrated. Hereinafter, a contact lens containing the ceria particles will be described as an example. The descriptions of overlapping portions with the portions as exemplified above will be omitted.

In the contact lens containing ceria particles according to one embodiment of the present disclosure, the ceria particles are dispersed in the poly-2-hydroxyethyl methacrylate (PHEMA) hydrogel.

The contact lens containing the ceria particles according to an embodiment of the present disclosure allows the ceria particles to eliminate the reactive oxygen species or harmful radicals, thereby to treat and prevent the eye diseases.

The contact lens containing ceria particles according to one embodiment of the present disclosure can solve the problem of reduced transparency due to the aggregation of conventional ceria particles as illustrated above. To this end, the ceria particles used according to the present disclosure are obtained by the following steps: 1) dissolving 6-aminohexanoic acid in distilled water to form a first solution, heating the solution to 90 to 100° C., dissolving hydrochloric acid in the first solution, and adjusting the pH of the first solution to 5 to 6; and 2) dissolving cerium (III) nitrate hexahydrate in distilled water at room temperature to form a second solution, mixing the heated first solution and the second solution to form a mixed solution, stirring the mixed solution, and cooling the mixed solution to a room temperature. Using the above two steps 1) and 2) may produce the ceria particles according to the present disclosure. Then, the ceria particles may be applied to the contact lens.

In the contact lens containing ceria particles according to one embodiment of the present disclosure, the poly-HEMA is obtained as follows: 2-hydroxyethyl methacrylate (HEMA), ethylene glycol dimethacrylate (EGDMA) and deionized water were mixed to form a mixed solution. A photo-initiator is administered in the mixed solution. Then, ultraviolet rays are applied to the mixed solution to prepare the cross-linked hydrogel PHEMA.

In one example, during preparing the cross-linked hydrogel poly-HEMA (PHEMA), at least one of NVP, MAA, and MMA may be added into the PHEMA to increase the water content in the PHEMA and strength thereof.

Further, to maintain proper transparency for the contact lenses, the ratio between HEMA and deionized water should be controlled to satisfy a following relationship:

HEMA/(HEMA+deionized water)≤70%.

In the contact lens containing the ceria particles exemplified above, the above ceria particles are dispersed and wholly are embedded in the cross-linked hydrogel PHEMA. In one example, instead of the configuration in which the water-soluble ceria nanoparticles are dispersed in the contact lens, an insert having various patterns including a ring pattern containing the water-soluble ceria nanocomposite in a high concentration is prepared, and the insert is inserted into the contact lens.

FIG. 3 shows a configuration of a contact lens containing ceria particles according to one embodiment of the present disclosure, wherein the ceria particles have a particular arrangement.

As in FIG. 3, the ceria particles may constitute a ring pattern surrounding the center of the contact lens. In another example, the ceria particles may form various patterns surrounding the center of the contact lens.

The insert having various patterns including the ring pattern containing the ceria particles at a high concentration is manufactured. The insert is inserted into the contact lens. This makes it possible to produce a contact lens containing a high concentration of water-soluble ceria nanocomposite without affecting the basic function of the contact lens, i.e., the vision correction function. In other words, no ceria particles are placed in a region corresponding to the pupil of the eye. Thus, this may also minimize the effect of opacity due to the ceria particles.

So far, we have illustrated the configuration of the present disclosure. Hereinafter, further content of the present disclosure will be exemplified with reference to specific Present Examples.

Present Example 1

In Present Example 1, a contact lens containing ceria particles was directly fabricated. A list of materials used in Present Example 1 is as follows:
Cerium(III) nitrate hexahydrate (Alfa aesar)
6-Aminohexanoic acid (Aldrich(fluka))
Hydrochloric acid (Sigma)

2-Hydroxyethyl methacrylate (HEMA) (Sigma)
Ethylene glycol dimethacrylate (EGDMA) (Sigma)
2-Hydroxy-2-methylpropiophenone (Darocur) (Sigma)
1-Vinyl-2-pyrrolidinone (NVP) (Sigma)
Methyl methacrylate (MMA) (Sigma)
Methacrylic acid (MAA) (Sigma)

First, the ceria particles were prepared as follows: we dissolved 6-aminohexanoic acid in distilled water to form a first solution, heated the solution to 95° C., dissolved hydrochloric acid in the first solution, and adjusted the pH of the first solution to 5.5. Then, we dissolved cerium (III) nitrate hexahydrate in distilled water at room temperature to form a second solution, mixed the heated first solution and the second solution to form a mixed solution, stirred the mixed solution for one minute, and cooled the mixed solution to a room temperature. The cooled product was washed with acetone to obtain ceria particles.

Next, the cross-linked hydrogel PHEMA was prepared as follows: 2-hydroxyethyl methacrylate (HEMA), ethylene glycol dimethacrylate (EGDMA) and deionized water were mixed at an appropriate ratio to form a mixed solution. Darocur as a photo-initiator was administered in the mixed solution. Then, ultraviolet rays at 365 nm wavelength are applied to the mixed solution to prepare the cross-linked hydrogel PHEMA. Further, in order to increase the water content in the PHEMA and increase the strength of the PHEMA, NVP capable of copolymerization with the HEMA was blended in the HEMA and then, photo-curing polymerization reaction was performed thereto. FIG. 4 shows a reaction to obtain a poly-HEMA (PHEMA) hydrogel.

Next, the monomer mixture for poly-HEMA (PHEMA) hydrogel and the water-soluble ceria nanocomposites are mixed with each other, and then the mixture is injected into a mold having a contact lens shape. Then, photo-curing polymerization reaction was initiated to obtain ceria-embedded PHEMA with the contact lens shape. In addition, we obtained a more refined contact lens shape via punching.

FIGS. 5a and 5b show a 14 mm-diametered contact lens containing ceria nanoparticles produced according to an embodiment of the present disclosure. As shown in FIG. 5b, contact lenses containing water-soluble ceria nanoparticles were found to maintain transparency.

Further, we conducted an experiment to determine the transparency of the contact lens based on the content of HEMA in the contact lens containing ceria nanoparticles. We compared opacities of the contact lenses with one another based on different HEMA compositions and the same amount (10,000 μM) of water-soluble ceria nanocomposites. FIGS. 6a to 6e show a transparency of the contact lens based on a HEMA/(HEMA+deionized water) % value. As shown in FIGS. 6a to 6e, it is confirmed that when the HEMA/(HEMA+deionized water) % value exceeds 70%, the opacity of the contact lens gradually increases.

FIG. 7 shows a result of an Amplex red hydrogen peroxide/peroxidase assay to confirm a hydrogen peroxide elimination ability by the contact lens containing water-soluble ceria nanoparticles according to one embodiment of the present disclosure. We fabricated a 14 mm-diametered contact lens containing water soluble ceria nanoparticles. We immersed the lens in Optic-free Express lens preservation solution (Alcon) for one day. We added hydrogen peroxide in the lens preservation solution, 1.45 mM PBS (similar to the actual amount of phosphate in tears), and commercially available artificial tears. Then, the lenses were placed in each solution containing hydrogen peroxide, and reactions therebetween occurred for 2 hours.

We confirmed whether the contact lens according to the present disclosure could eliminate the hydrogen peroxide. Based on the confirmation results, it was observed that the elimination rate of the hydrogen peroxide varied depending on the amount of the water-soluble ceria nanocomposite contained in the contact lens according to the present disclosure. That is, it was confirmed that in the experiments using the lens preservatives, the 1.45 mM PBS similar to the actual amount of phosphate in tears, and commercially available artificial tears which may contact the lens under normal circumstances, the hydrogen peroxide was successfully eliminated when the lens preservatives, the 1.45 mM PBS similar to the actual amount of phosphate in tears, and commercially available artificial tears were exposed to the contact lens containing the water soluble ceria nanocomposite.

When the amount of the reactive oxygen species increase, lipid peroxidation of cell membranes, oxidative changes of proteins, and oxidative damage of DNA may be caused. It is known that the lipid peroxidation of cell membranes, oxidative changes of proteins, and oxidative damage of DNA may cause various ocular diseases such as cataract, uveitis, retinopathy of prematurity, age-related macular degeneration, primary open angle glaucoma, corneal aging, corneal inflammation, dry eye syndrome, keratoconus, Fuchs' corneal endothelial dystrophy, and bullous keratopathy. The contact lens containing the water-soluble ceria nanocomposite according to the present disclosure effectively eliminates the reactive oxygen species and harmful radicals that are identified as the cause of the eye diseases. Accordingly, the content lens according to the present disclosure is expected to be useful for prevention of eye disease as well as for treatment of the eye diseases. The illustrations of the presented embodiments are provided so that a person of ordinary skill in the art of the present disclosure may use or implement the present disclosure. Various modifications to these embodiments will be readily apparent to those skilled in the art of the present disclosure. The general principles defined herein may be applied to other embodiments without departing from the scope of the present disclosure. Thus, the present disclosure is not to be construed as limited to the embodiments set forth herein but rather to be accorded the widest scope consistent with the principles and novel features set forth herein.

What is claimed is:

1. A method for manufacturing a contact lens containing ceria particles, the method comprising:
   preparing ceria particles;
   preparing a cross-linked hydrogel comprising poly-2-hydroxyethyl methacrylate (PHEMA or poly-HEMA), wherein the preparing of the cross-linked hydrogel comprises:
      mixing 2-hydroxyethyl methacrylate (HEMA), ethylene glycol dimethacrylate (EGDMA), deionized water, and the ceria particles with at least one monomer selected from the group consisting of 1-vinyl-2-pyrrolidinone (NVP) and methyl methacrylate (MMA), to form a mixed solution;
      adding a photo-initiator into the mixed solution; and
      applying ultraviolet rays to the mixed solution to obtain the cross-linked hydrogel;
   injecting the cross-linked hydrogel in a mold having a contact lens shape; and
   performing photo-curing polymerization of the cross-linked hydrogel,
   wherein the ceria particles eliminate reactive oxygen species or harmful radicals, and wherein in preparing the cross-linked hydrogel, a ratio between contents of the HEMA and deionized water is controlled to satisfy a following relationship:

HEMA/(HEMA+deionized water)=60%.

2. The method of claim 1, wherein the preparing of the ceria particles comprises:
dissolving 6-aminohexanoic acid in distilled water to form a first solution;
heating the first solution to 90 to 100° C.;
dissolving hydrochloric acid in the first solution;
adjusting pH of the first solution to 5 to 6;
dissolving cerium (III) nitrate hexahydrate in distilled water at room temperature to form a second solution;
mixing the heated first solution and the second solution to form a mixture of the first solution and the second solution; and
stirring and cooling the mixture of the first solution and the second solution to a room temperature.

3. The method of claim 1, wherein the method further comprises, after performing the photo-curing polymerization of the cross-linked hydrogel, punching the cured cross-linked hydrogel to obtain the contact lens in a form of a lens.

4. The method of claim 1, wherein the amount of the ceria particles contained in the contact lens is from 1,000 µM to 10,000 µM.

5. A contact lens comprising:
a cross-linked hydrogel comprising poly-2-hydroxyethyl methacrylate (PHEMA or poly-HEMA); and
water-soluble ceria particles dispersed in the poly-2-hydroxyethyl methacrylate (PHEMA or poly-HEMA), wherein the cross-linked hydrogel is prepared by:
mixing 2-hydroxyethyl methacrylate (HEMA), ethylene glycol dimethacrylate (EGDMA), deionized water, and ceria nanoparticles with at least one monomer selected from the group consisting of 1-vinyl-2-pyrrolidinone (NVP) and methyl methacrylate (MMA), to form a mixed solution;
adding a photo-initiator into the mixed solution; and
applying ultraviolet rays to the mixed solution,
wherein the ceria particles eliminate reactive oxygen species or harmful radicals, and
wherein in preparing the cross-linked hydrogel, a ratio between contents of the HEMA and deionized water is controlled to satisfy a following relationship:

HEMA/(HEMA+deionized water)=60%.

6. The contact lens of claim 5, wherein the ceria particles are prepared by:
dissolving 6-aminohexanoic acid in distilled water to form a first solution;
heating the first solution to 90 to 100° C.;
dissolving hydrochloric acid in the first solution;
adjusting pH of the first solution to 5 to 6;
dissolving cerium (III) nitrate hexahydrate in distilled water at room temperature to form a second solution;
mixing the heated first solution and the second solution to form a mixture of the first solution and the second solution; and
stirring and cooling the mixture of the first solution and the second solution to a room temperature.

7. The contact lens of claim 5, wherein the amount of the water-soluble ceria particles contained in the contact lens is from 1,000 µM to 10,000 µM.

8. A contact lens comprising:
a cross-linked hydrogel comprising poly-2-hydroxyethyl methacrylate (PHEMA or poly-HEMA); and
an insertion received in the cross-linked hydrogel, wherein the insertion is composed of water-soluble ceria particles at a high concentration, wherein the insertion has a pattern surrounding a center of the contact lens, wherein the cross-linked hydrogel is prepared by:
mixing 2-hydroxyethyl methacrylate (HEMA), ethylene glycol dimethacrylate (EGDMA), deionized water, and ceria nanoparticles with at least one monomer selected from the group consisting of 1-vinyl-2-pyrrolidinone (NVP) and methyl methacrylate (MMA), to form a mixed solution;
adding a photo-initiator into the mixed solution; and
applying ultraviolet rays to the mixed solution, and
wherein in preparing the cross-linked hydrogel, a ratio between contents of the HEMA and deionized water is controlled to satisfy a following relationship:

HEMA/(HEMA+deionized water)=60%.

9. The contact lens of claim 8, wherein the insertion has a ring shape.

* * * * *